United States Patent [19]
Ayres

[11] 3,920,557
[45] Nov. 18, 1975

[54] SERUM/PLASMA SEPARATOR--BEADS-PLUS-ADHESIVE TYPE

[75] Inventor: Waldemar A. Ayres, Rutherford, N.J.

[73] Assignee: Becton, Dickinson and Company, East Rutherford, N.J.

[22] Filed: Feb. 27, 1974

[21] Appl. No.: 446,343

[52] U.S. Cl. ................. 210/516; 128/2 F; 128/272; 210/DIG. 23
[51] Int. Cl.² ........................................ B01D 21/26
[58] Field of Search ....... 23/230 B, 258.5, 259, 292; 128/2 F, 214 R, 218 M, 272, 220, DIG. 5; 210/83, 84, 131, 359, 514–518, DIG. 23, DIG. 24; 233/1 A, 1 R, 26

[56] References Cited
UNITED STATES PATENTS

| | | | |
|---|---|---|---|
| 3,586,064 | 6/1971 | Brown | 210/DIG. 24 |
| 3,647,070 | 3/1972 | Adler | 210/DIG. 23 |
| 3,780,935 | 12/1973 | Lukacs et al. | 210/83 X |
| 3,852,194 | 12/1974 | Zine, Jr. | 210/DIG. 23 |

*Primary Examiner*—John Adee
*Assistant Examiner*—Robert G. Mukai
*Attorney, Agent, or Firm*—Kane, Dalsimer, Kane, Sullivan and Kurucz

[57] ABSTRACT

The disclosure is of a method and apparatus for the separation and isolation of the separated plasma or serum phase of a blood specimen. The method comprises the in situ formation of a barrier between the separated lighter plasma or serum phase and the heavier cellular phase of the blood specimen, accomplished by centrifugation. The barrier comprises beads of certain specific gravity, which are coated with an adhesive. The apparatus employed comprises a conventional vacuum container having the barrier component located in a position adjacent to or within a closure member of the container.

4 Claims, 2 Drawing Figures

U.S. Patent    Nov. 18, 1975    3,920,557
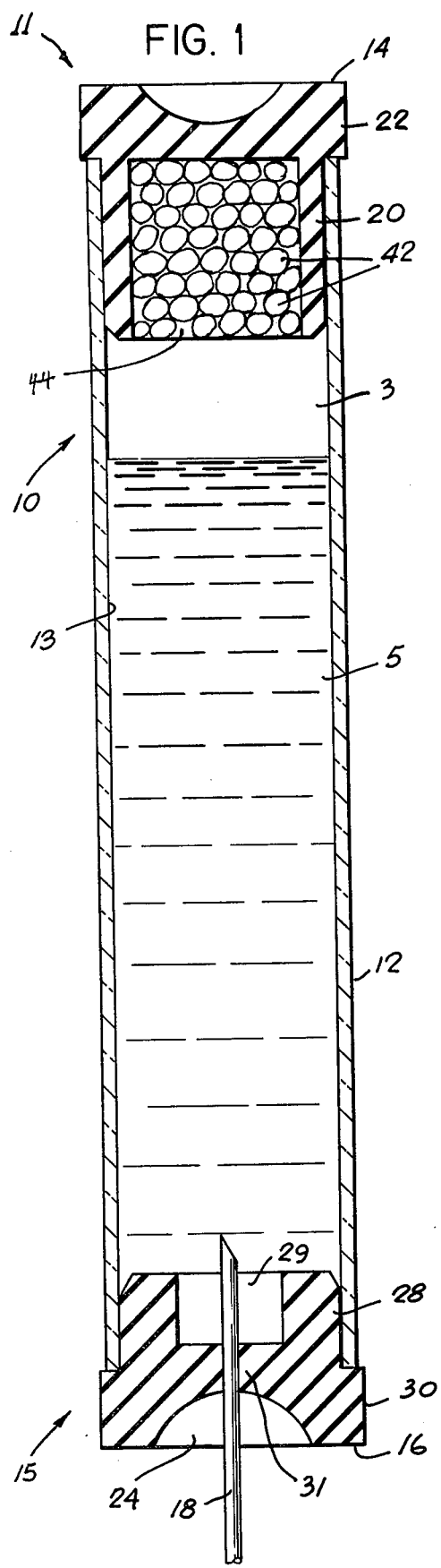
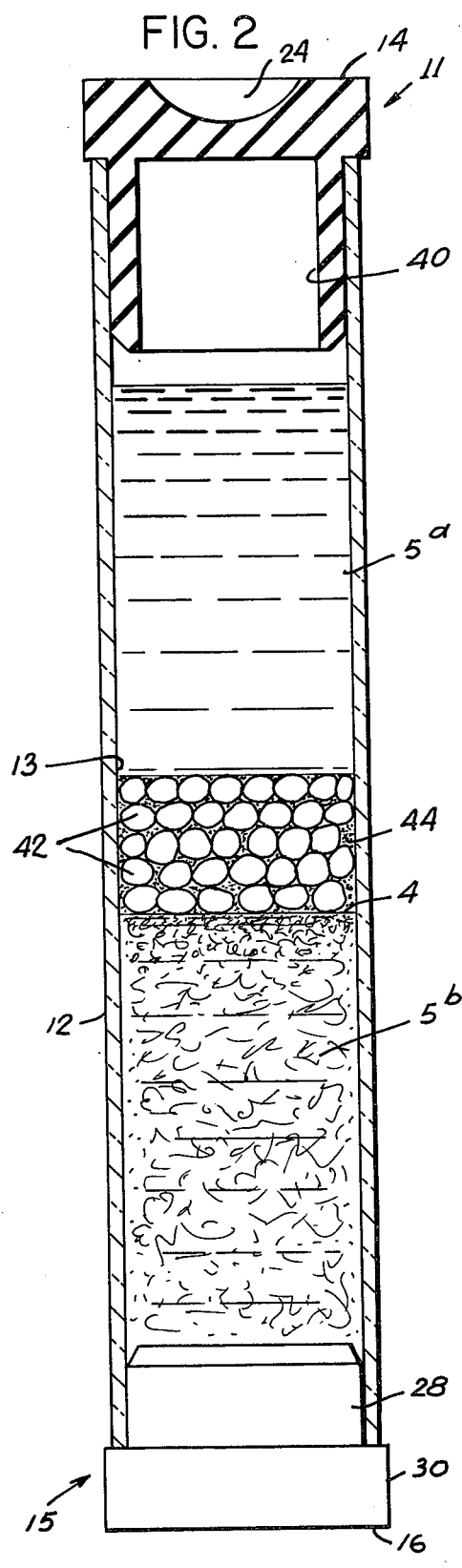

SERUM/PLASMA SEPARATOR--BEADS-PLUS-ADHESIVE TYPE

BACKGROUND OF THE INVENTION

1. Field of the Invention

The invention concerns a method and apparatus for isolating separated blood plasma or serum from a blood specimen and more particularly concerns a method and apparatus for fabricating a barrier in situ at the interface between separated blood plasma or serum and the cellular components of a blood specimen.

2. Brief Description of the Prior Art

Prior hereto, the use of beads was previously known as a barrier material to form a barrier at the interface between light and heavy phases of liquid-solids mixtures. Illustrative of the prior art methods is that described in U.S. Pat. No. 3,647,070. This patent teaches depositing spheres or granules of synthetic hydrophylic polymers into containers of serum and plasma separated blood mixtures. The polymer material settles at the interface between lighter and heavier phases because of its intermediate specific gravity. Over a period of time, the hydrophylic material absorbs plasma or serum and swells. The swollen granules and spheres adhere to each other and compact to form the desired barrier. However, this barrier may have interconnecting spaces between the granules so that this barrier is not a reliable seal.

The use of silicone sealants containing filler materials has also been described as a method for the in situ formation of an impervious barrier to isolate the separable light and heavy phases of blood; see for example, U.S. Pat. No. 3,780,935.

In general, the prior art devices have not provided a unitary construction which may be pre-assembled for use when and where required. Consequently, the prior art methods associated with the prior art devices have comprised multi-step procedures which are time consuming, wasteful of labor and inefficient. By my invention, a self-contained and unitary blood plasma or serum separator is provided wherein an impervious barrier may be established in situ at the interface between the light plasma or serum and the heavier or cellular phase of a given blood specimen. This unitary separator is conveniently employed, using fewer steps to utilize than was heretofore possible.

SUMMARY OF THE INVENTION

The invention comprises a self-contained, unitary separator assembly for the separation and isolation of blood plasma and blood serum from blood which comprises: (a) a container having a first open end which is adapted to receive blood for subsequent separation into a light phase and a heavy phase and a second open end for removing said light phase; (b) closures sealing the ends of said container which are formed of a self-sealing elastomeric material which is penetrable by a cannula; and (c) a multiplicity of beads or granules coated with an adhesive which is immiscible and insoluble in blood, said beads having a specific gravity between about 1.03 and 1.09, said coated beads being adhered together in a position adjacent to the closure for said second end. The invention also comprises a method of separating and isolating the lighter phase from the heavier phase of blood which comprises filling an evacuated assembly of the invention with blood and centrifuging the filled assembly.

BRIEF DESCRIPTION OF THE DRAWINGS

FIG. 1 is a cross-sectional side elevational view of a separator assembly of the invention illustrating a cannula penetrating one of the closures and through which blood is introduced into the container prior to separation.

FIG. 2 is a view similar to FIG. 1 illustrating the separation of the blood into the light phase and heavy phase with the phases separated by an impermeable barrier of adhesively coated beads.

DETAILED DESCRIPTION OF THE INVENTION

For a better understanding of the invention, a description of the drawings of the illustrative embodiments is had, particularly with respect to the embodiments shown in FIGS. 1 and 2.

Referring to FIG. 1, it is seen that the separator assembly 10 comprises a tubular member or container 12 having mounted in each open end 11, 15, closures 14 and 16. Closures 14 and 16 are made of a self-sealing elastomeric material, such as rubber. The closure 15 is pierced by cannula 18, as illustrated in FIG. 1, for conducting blood 5 into the container. When the cannula is removed the closure is automatically resealed.

Closure 14 is formed having a depending cylindrical body portion 20 and a flanged head portion 22 integrally formed therewith. Body portion 20 has a diameter slightly greater than the internal diameter of the container 12 so that closure 14 when mounted into end 11 provides an interference fit to seal the end. Head portion 22 is preferably shaped in the form of a hexagon and is slightly greater in diameter than body portion 20, which permits the assembly to be positioned on its side without danger of rolling. An axial recess 24 is provided for easy access through stopper 16, which reduces the force required to penetrate the stopper with cannula 18. As seen best in FIG. 2, closure 14, the closure opposite to the end receiving blood, has an axial recess 40 in the lower surface thereof. As seen in FIG. 1, the axial recess 40 prior to centrifugation is filled with beads or granules 42 coated with an adhesive 44 which fills the interstices between beads 42. The beads may be formed of any material which has no undesirable reaction with blood or with chemicals used in subsequent tests and having a specific gravity between about 1.03 and 1.09 (preferably about 1.05) Polystyrene beads have been used successfully, for example.

The beads are coated with a moderately sticky adhesive to make the beads cohere and to fill the interstices between adhered beads. Illustrative of an adhesive which may be used is a high viscosity silicone grease. For example, a silicone grease having a viscosity of approximately 30,000 centistokes has been used successfully. Silicone grease is a preferred adhesive since it is insoluble and immiscible in blood and non-reactive therewith. Such properties are advantageous in a barrier material for the separation of blood components.

Stopper 16 is formed preferably of the same material as stopper 14. Stopper 16 has a cylindrical body portion 28 and an integrally formed head portion 30 having an axial recess 24. Body portion 28 has an annular recess 29 to provide a self-sealing penetrable zone 31 to facilitate insertion of cannula 18 with minimum force while maintaining a sealed closure. As noted above, stoppers 14 and 16 are inserted into ends 11 and 15 respectively in compression to maintain ends 11 and 15 of container 12 in sealed engagement.

Tubular member or container 12 is formed preferably of glass but a suitable plastic material may be employed.

The method of the invention is carried out by first filling an assembly of the invention with blood 5 as shown in FIG. 1. Preferably, the assembly is first evacuated of air so that when cannula 18 penetrates closure 16 blood will fill container 12.

If plasma is to be separated the container 12 may also contain an anti-coagulant agent to prevent coagulation of the blood specimen. Admixture of blood and anticoagulant may be effected within the container 12.

After cannula 18 is withdrawn and container 12 is filled with blood the assembly is placed in a centrifuge and the blood components are separated by conventional methods. For example, the blood specimen together with the apparatus of the invention may be centrifuged for approximately 10 minutes at approximately 2500 RPM. If serum is to be isolated from whole blood, it is preferred that clot formation be substantially complete before the assembly with the contained whole blood is centrifuged. Generally, clot formation is complete when the specimen is allowed to stand for an hour at room temperature. Preferably, the assembly of the invention is positioned upright with the beads 42 at the top while the blood specimen coagulates.

As the assembly is centrifuged, the heavier phase 5b of the blood moves to the lower portion of the tube 12, displacing the lighter phase 5a to the upper portion of tube 12 as shown in FIG. 2, forming an interface 4 between the two phases. At the same time, the centrifugal force breaks the adhered beads 42 free from their position in cavity 40 of stopper 14. Beads 42 with their coating 44 sink in light phase 5a, but being less dense than heavy phase 5b they "float" at the interface 4 and coalesce to form an impervious barrier between the separated phases as shown in FIG. 2.

As shown in the drawings, closure 14 is especially adapted to hold the beads 42 with their adhesive 44 prior to centrifugation. This is a preferred embodiment but not a necessary feature. The closure 14 may be a solid elastomeric plug and the adhered beads 42 may be held in place within the upper end of chamber 3 (see FIG. 1). The adhesive 44 not only serves to hold the beads 42 together, but holds beads 42 in a sealed relationship with inner wall 13 of container 12.

FIG. 2 shows the beads 42 adhered together by adhesive 44 at a point just above interface 4 following separation of the light phase 5a from heavy phase 5b. During centrifugation, the adhesive bonds between beads 42 and between beads 42 and wall 13 break, allowing the coated beads 42 to descend to interface 4. Upon reaching interface 4, the adhesive bonds are reformed, adhesive 44 filling the interstices between beads 42 and between beads 42 and wall 13, thereby forming in situ an impermeable barrier between the separated phases. In this sealed separation, the assembly may be tipped or inverted without causing a rupture of the barrier. Depending on which of the separated phases is desired for diagnostic or other use, one of the closures, 14 or 16, may be removed and the phase 5a or 5b may be decanted or pipetted off, or otherwise removed.

The volume of granules 42 employed to form the desired barrier is not critical, so long as they are sufficient to cover the interface 4. Preferably, a multilayer barrier of beads are formed, having an overall barrier axial thickness of from about ⅜ths to ⅝ths of an inch.

Alternatively, the granules plus adhesive having a specific gravity of between 1.03 and 1.09 may be eliminated and an amorphous single material or homogenous mixture having at least moderate adhesive properties sufficient for forming an adherent barrier seal plus specific gravity between 1.03 and 1.05, may be used. This amorphous sealing material may include more than one ingredient. For example, a putty having selected plasticity, adhesiveness and specific gravity might be used.

What is claimed is:

1. A self-contained unitary separator assembly for the separation and isolation of blood plasma or blood serum from blood cellular material which comprises:
   a. a container having a first open end which is adapted to receive blood for subsequent separation into a light phase and a heavy phase and a second open end for removing said light phase;
   b. closures sealing the open ends of the container, said closures being formed of a self-sealing elastomeric material which is penetrable by a cannula; and
   c. a multiplicity of polystyrene beads coated with an adhesive silicone grease having a viscosity of about 30,000 centistokes and which is immiscible and insoluble in blood and non-reactive therewith, said beads having a specific gravity between about 1.03 and 1.09, said coated beads being adhered together in a location adjacent to the closure for said second end.

2. An assembly according to claim 1 wherein the closure for said second end has an axial recess in the lower surface thereof for receiving the coated beads.

3. An assembly according to claim 1 wherein said beads have a specific gravity of about 1.05.

4. An assembly according to claim 1 wherein said beads form a barrier layer within said container, said layer having a thickness of from about ⅜ths to ⅝ths of an inch thick.

* * * * *